April 1, 1958 A. E. R. ARNOT 2,828,879
MAST AND OTHER LOAD LIFTING TRUCKS
Filed Nov. 21, 1955 6 Sheets-Sheet 6

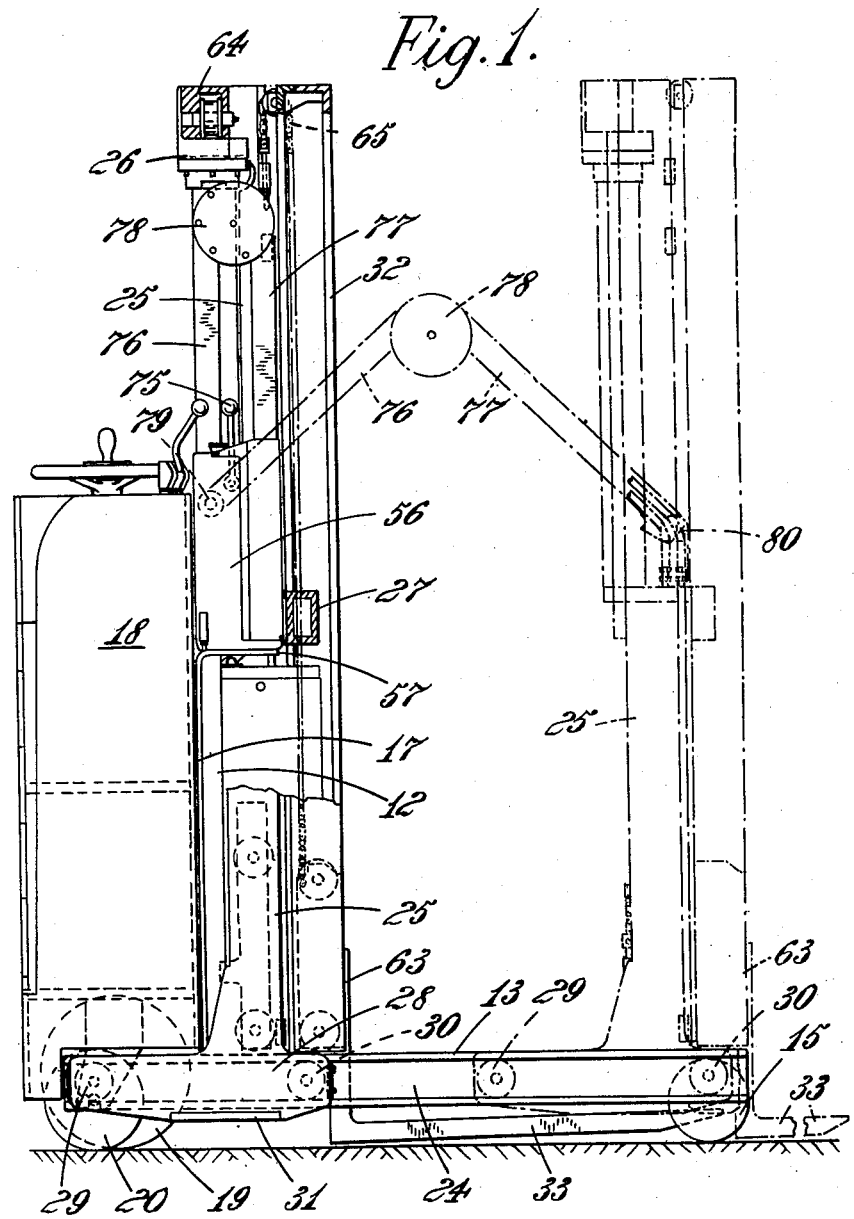

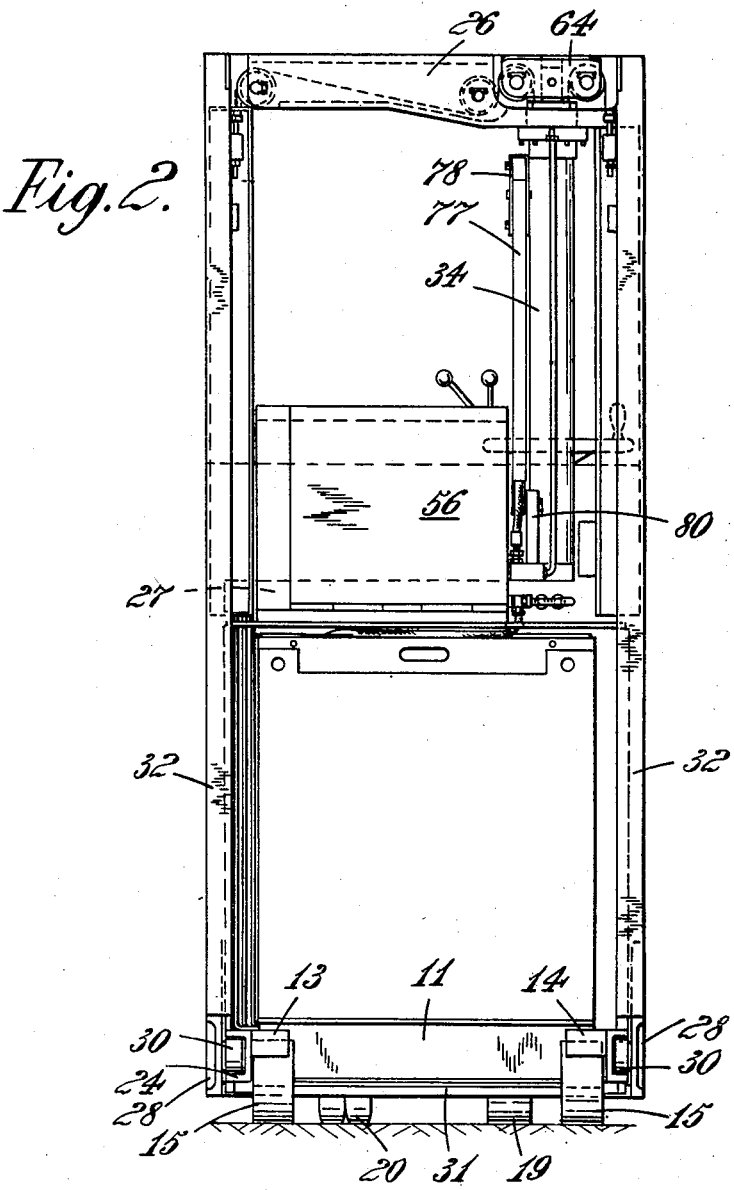

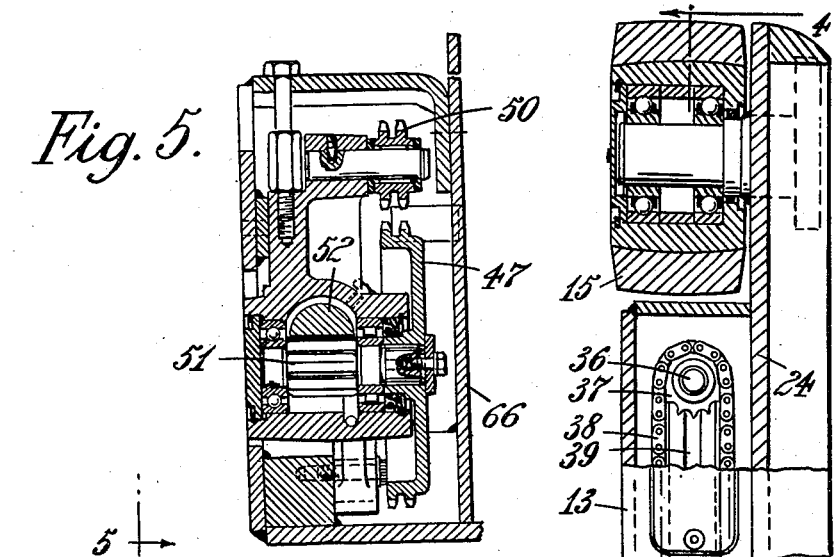
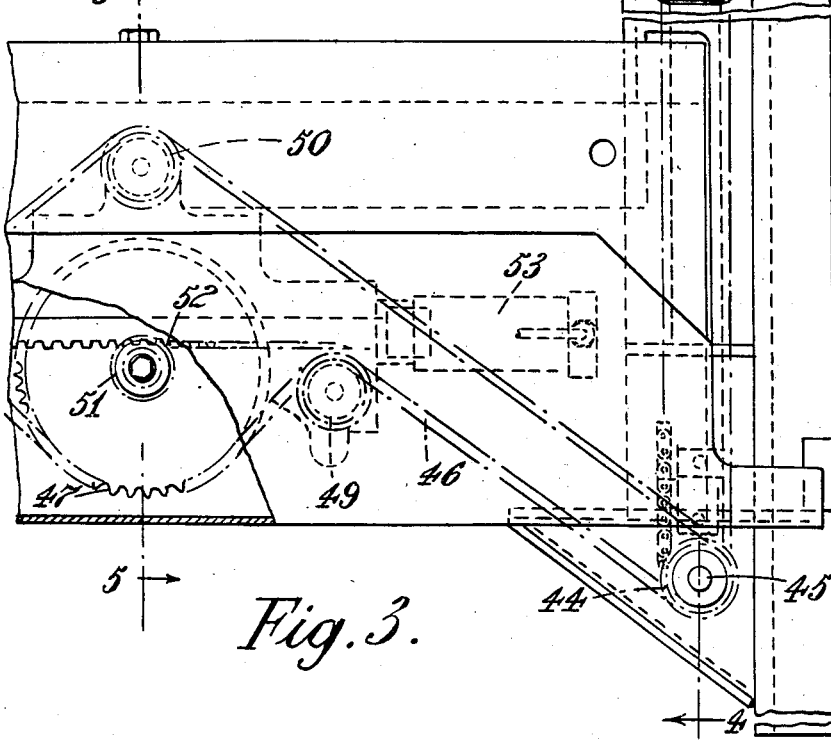

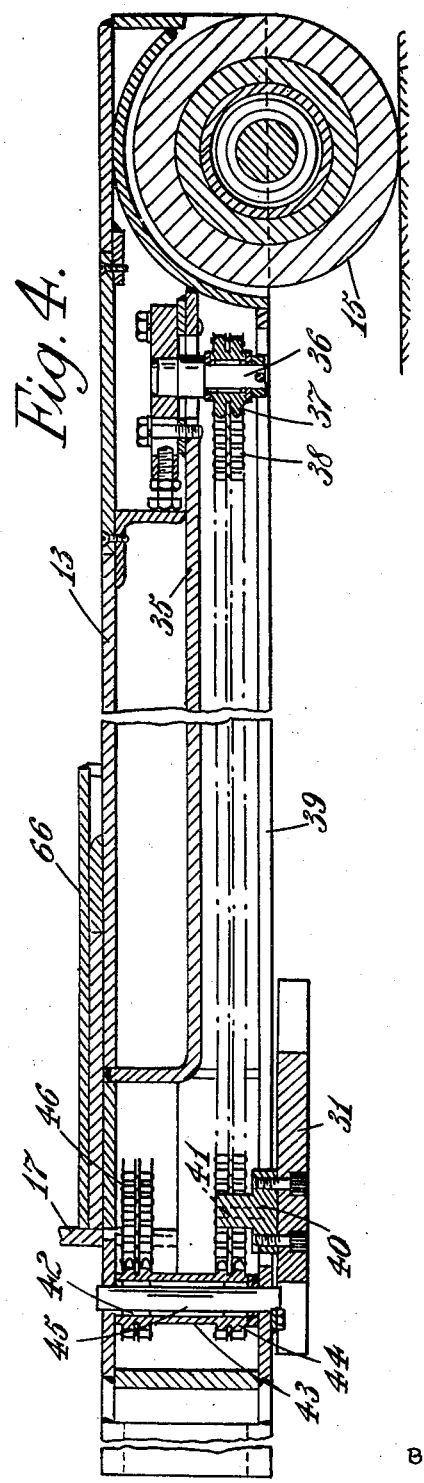

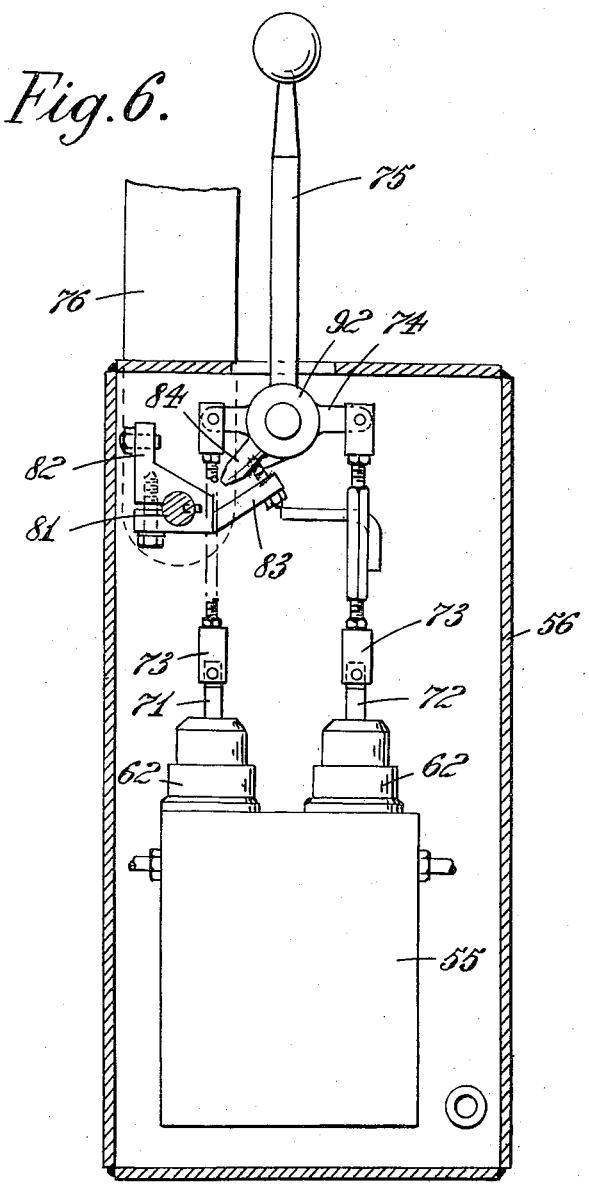

INVENTOR
Alfred E. R. Arnot
By Martin Kirkpatrick
ATTORNEY

United States Patent Office 2,828,879
Patented Apr. 1, 1958

2,828,879

MAST AND OTHER LOAD LIFTING TRUCKS

Alfred Erwin Reginald Arnot, Basingstoke, England, assignor to John Reginald Sharp and Emmanuel Kaye, both of Basingstoke, England Application November 21, 1955, Serial No. 548,200

Claims priority, application Great Britain November 23, 1954

6 Claims. (Cl. 214—670)

This invention comprises improvements in or relating to mast and other load lifting trucks of the kind in which the load supporting structure is movable fore and aft in a horizontal direction.

On such a truck, if the load is to be advanced or retracted, especially if the load is elevated, there is a distinct tendency to tip the truck over, and this is accentuated if the load carrying structure is brought suddenly to rest at one or other end of its movement. The operator can, of course, control by his skill the acceleration or retardation imparted to the load so as to keep it within proper limits, but this is not easy, and if he lets the load get too near the end of the stroke before retardation, it is impossible. As the consequences of the truck overturning may be serious, not only for the goods carried but for the operator or other personnel, it is important as far as possible to guard against this eventuality. Hitherto a degree of safety has been achieved by drastic limitation of the speed of advance of the load, but present requirements of fast operation make this unacceptable.

The present invention therefore comprises in a fork or like truck the combination of a straddle leg frame, a travelling load supporting structure thereon so that the fork (or equivalent load carrying member) can be advanced and retracted, means for advancing and retracting the load carrying member and means to govern the speed of advance and retraction so as to limit the acceleration and retardation forces at either or both ends of the travel to less than will produce the overturning moment of the truck.

If hydraulic operating means for a travelling mast is provided, then according to the present invention the means to govern the speed of advance and retraction may consist of a hydraulic variable-flow control valve and automatic operating means therefor.

In a preferred construction, the control according to the present invention comprises a hand-operated lever to vary the hydraulic flow variable control valve and a lost-motion connection between the lever and a member operated by the travelling load carrying structure to move the lever towards a position of minimum flow as the structure approaches the end of its travel, thereby at this position taking control out of the hands of the operator. Preferably the automatic retardation is arranged to occur at both ends of the travel of the load carrying structure, although the most important place for the exercise of automatic control is at the termination of the forward end of the travel, because overturning of the truck is easiest here.

The following is a description by way of example of one construction in accordance with the invention.

Referring to the accompanying drawings:

Figure 1 is a side elevation of a truck;

Figure 2 is a front elevation of the same;

Figure 3 is a plan to a larger scale of a portion of the truck shown in Figures 1 and 2 with the travelling mast removed;

Figure 4 is a section upon the line 4—4 of Figure 3 looking in the direction of the arrows;

Figure 5 is a section upon the line 5—5 of Figure 3 looking in the direction of the arrows;

Figure 6 is a detail to an enlarged scale of the tappet mechanism for automatically retarding the movement of the mast.

Figure 7:
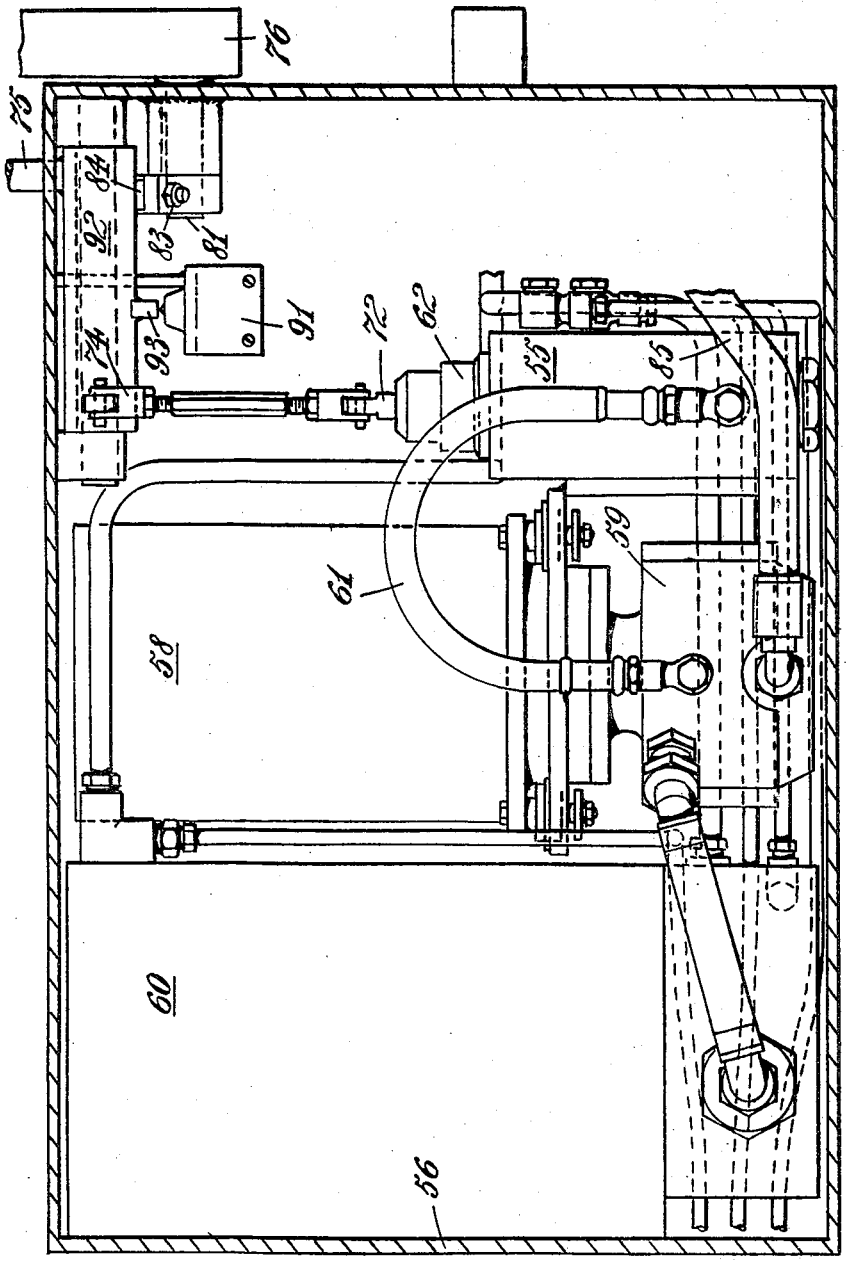
Figure 7 is another view of the same in a plane at right angles to that of Figure 6.

A goods-handling truck is provided comprising at one end a transverse chassis portion 11 on which is an upstanding battery-containing portion 12 and at each side of which there exted forwardly horizontal chassis members 13, 14, or "straddle legs," each of which carries a ground wheel 15 at its forward end. The transverse portion of the chassis has a flat back plate 17 against which is pivotally secured a rear unit 18 which carries a driving wheel 19 mounted for steering purposes and a castor wheel 20, substantially as described in patent application No. 486,616, filed February 7, 1955. One of the "straddle legs" 13 is shown in Figure 3 of the drawing in plan, and as can be seen from this figure it is a hollow box-shaped member on the outside of which there is secured a channel guide 24. The flanges of the channel guides 24 project outwardly and they serve as guides for a travelling mast 25 which consists of two side members united together by a cross-member 26 at the top, by another cross-member 27 at about half-way from the top and by a horizontal transverse plate 31 at the bottom. The side members have foot portions 28 which carry rollers 29, 30, to run in the channel guides 24 and the mast is thereby enabled to slide fore and aft on the "straddle legs." The bottom plate 31 which unites the side members passes beneath the chassis 11 of the truck. On the front of the mast 25 there slides a rising mast 32 which carries a carriage 63 for fork arms 33. (The carriage and fork arms are seen in Figure 1 but are omitted from Figure 2.) The rising mast 32 is lifted by the operation of an hydraulic cylinder 34 to one side of the centre of the truck, the rim of which operates an element 64, which carries rollers engaging chains which are attached to the rising mast 32 at one end and are anchored to the ram of the cylinder 34 at the other end as described in patent application No. 507,965 filed May 12, 1955. Further chains 65 anchored to the fixed mast 25 and passing over rollers to the carriage 63 cause the latter to be lifted when the rising mast 32 is raised.

As can be seen from Figure 4 of the drawing, the box-shaped portion of each of the "straddle legs" 13, 14, contains a horizontal partition 35 and below the partition there is a stub spindle 36 for a sprocket 37 on which runs a chain 38 inside the box portion of the leg. Below the chain 38 is a slot 39 and the cross-member 31 of the travelling mast carries a member 40 which projects upwardly through the slot and has a lateral projection 41 attached to one of the links on one side of the chain 38. The travelling mast has been omitted in Figure 3 of the drawing but the run of the chain 38 can be seen in this figure. As will be clear, by operating the chains 38 in both "straddle legs" the mast can be advanced and retracted.

For this purpose it is necessary that each of the chains 38 in the two "straddle legs" should be driven simultaneously at the same speed. At the back of each "straddle leg" 13 and 14, there is a non-rotatable spindle 42 on which is mounted a hollow shaft 43 carrying a sprocket 44 at the bottom end and a second sprocket 45 at the top. The chain 38 runs on and is driven by the sprocket 44 and there is a second chain 46 which drives the upper sprocket 45. The chain 46 runs, as shown in Figure 3, over a central driving sprocket 47 mounted to turn on a vertical axis in the centre of the transverse portion of the truck below a cover plate 66. The chain 46 is endless and is guided on to the sprocket 47 from both sides of the truck by idler sprockets 48, while the return side of the chain is kept clear of the sprocket 47 by means of a guide sprocket 50. On rotating the sprocket 47 the chains on both sides of the truck, that is to say the chains 38 in the "straddle legs," can be moved together.

The sprocket 47 is operated by a pinion 51 (Figure 5) driven by a rack 52 operated by two hydraulic cylinders 53 on opposite sides of the pinion, seen in Figure 3.

Each of the cylinders 53 is single-acting and the cylinders are controlled by pipes which lead to the control valve 55 shown in Figures 6 and 7 of the drawings. This control valve is located in a box 56 supported on a shelf 57 at the top of the back plate 17, seen in Figure 1. The box, the internal layout of which is seen as a whole in Figure 7, contains an electric motor 58 driving a pump 59 and drawing from a reservoir 60. The pump delivery goes by a pipe 61 to the valve 55 and the valve 55 contains two valve elements 62 having operating stems 71, 72, actuated by links 73 from a two-armed lever 74 operated by a hand-lever 75. Moving the hand-lever 75 in a forward direction operates the valve stem 72 to cause one of the cylinders 53 in the base of the chassis to move the chains 46, 38, in the direction to advance the mast along the "straddle legs" 13, 14. Moving the lever 75 in the rearward direction, that is toward the operator standing on the back of the truck, operates the other cylinder of the pair 53 to retract the mast. The risk is that the operator may keep the lever 75 in its operative forward or aft position too long and allow the mast carrying a load upon the forks 73, possibly in an elevated position, to run up at full speed to the end of its movement, where it will stop with a jar and may cause the truck to overturn. The means for obviating this will now be described.

On one side of the box 56 there is pivoted one end of a channel member 76 as shown in dotted lines at 79 Figure 1 and to a larger scale in Figure 6 of the drawing. A second channel member 77 is hinged to the other end of the member 76 by means of a box-shaped pivot 78 somewhat like the joint of a large pair of compasses, while the other end of the channel member 77 is pivoted to the moving mast at 80, as can be best seen in the forward or chain line position of the mast 25 in Figure 1. Hydraulic pipes for supply of the ram cylinder 34 are taken through this frame from the pump box 56 but the frame is not merely used to carry the pipes; it is used to control automatically the retardation of the mast. To this end the member 76 of the frame is mounted on a rock-shaft 81 which carries two tappet arms 82, 83, with tappets to engage a tappet lever 84 projecting from the hub of the two-armed lever 74 already described. The tappets on the arms 82, 83, are adjusted so that as the mast 25 approaches the end of its movement in the forward direction, the tappet 82 will engage the tappet arm 84 and forcibly push the lever 75 back from the forward position in which the operator has placed it and will cause the valve-operating member 72 to return to a neutral position. It will be observed that the mast moves forward when the valve 72 is operated, quite slowly, and therefore the tappet 82 operated by the frame 76 will gradually close the valve 72 and slow down the movement of the mast to zero with an appropriately gradual deceleration. In the same way when the mast is being retracted, as it reaches the end of its movement, the tappet 83 will engage the other side of the tappet arm 84 and gradually force the lever 75 which has been moved rearwardly into its mid position, closing the valve operated by the valve member 71 and bringing the mast gently to rest at the end of its rearward travel. Both these movements are effective whether the operator is holding the lever 75 or not because the power of the operating cylinders 53 is sufficient to overcome any force exerted by the operator of the truck.

A micro switch 91 is located beneath the hub 92 of the lever 75 and is arranged to be operated by a cam 93 whenever the lever 75 is moved fore or aft from its mid position. This automatically starts the motor 58 for driving the pump 59 when the lever is moved but stops it when the lever is returned to its mid position. There may also be a centering spring acting on the lever 75 to keep it in the centered position when the motor is switched off, unless the operator or the lever 76 with tappets 82, 83, effect its displacement.

Alternatively, according to this invention, if the advance and retraction of the mast is produced by an electric motor drive it may be slowed down toward the end of its movements by operation of the frame mechanism 76, 77, used in this case to open or close electrical contacts; if the drive of the mast is by, say, an internal combustion engine, the frame 76, 77, may be used to engage and disengage a clutch.

I claim:

1. In a fork or like truck the combination of a straddle leg frame, a travelling load supporting structure thereon so that the fork (or equivalent load carrying member) can be advanced and retracted, hydraulic operating means for advancing and retracting the load carrying member and means to govern the speed of advance and retraction consisting of a hydraulic variable flow control valve and automatic operating means therefor, including a hand-operated lever to vary said hydraulic flow variable control valve and a lost motion connection between said lever and a member operated by the travelling load carrying structure to move the lever towards a portion of minimum flow as the structure approaches the end of its travel, thereby at this position taking control out of the hands of the operator, so as to limit the acceleration and retardation forces at either or both ends of the travel to less than will produce the overturning moment of the truck.

2. A truck as claimed in claim 1 wherein the load carrying structure is connected to a fixed part of the truck by means of a frame consisting of two links pivoted together and the ends of which are connected respectively to the load carrying structure and to a fixed part of the truck, and wherein the automatic retardation of the load carrying structure is effected by the movement of the frame-member which is connected to the fixed part of the truck.

3. A truck as claimed in claim 2 wherein the frame-member which is connected to the fixed part of the truck operates a rock shaft and the rock shaft controls the retardation by operating tappets which engage and return to neutral position a hand-operated member for advancing and retarding the load carrying structure.

4. In a fork or the like truck, the combination of a straddle leg frame, a mast structure mounted on said frame for horizontal movement therealong and means for moving said mast including control means effective to progressively reduce the speed of travel of said mast structure as it approaches at least one limit of its travel from a point in its travel a substantial distance from said limit to reduce the retardation forces at said one limit to prevent tipping of said truck due to said forces, said control means being automatically actuated by the mast structure upon arrival thereof at said point in its travel.

5. A truck as claimed in claim 4, wherein hydraulic operating means for said horizontal movement of the mast are provided and said control means consists of a hydraulic variable flow control valve having automatic operating means therefor.

6. A truck as claimed in claim 5 wherein said automatic operating means is connected to said mast structure to operate said valve towards a position of minimum flow as said mast structure approaches the end of its travel.

(References on following page)

References Cited in the file of this patent

UNITED STATES PATENTS

| | | |
|---|---|---|
| 858,207 | De V. Patten | June 25, 1907 |
| 2,126,289 | Schroeder | Aug. 9, 1938 |
| 2,351,872 | Parker | June 20, 1944 |
| 2,414,192 | Dunham | Jan. 14, 1947 |
| 2,620,936 | Abbe | Dec. 9, 1952 |
| 2,667,985 | Woughter | Feb. 2, 1954 |
| 2,752,056 | Lull | June 26, 1956 |

FOREIGN PATENTS

| | | |
|---|---|---|
| 1,093,804 | France | Nov. 24, 1954 |